United States Patent
Ho et al.

(10) Patent No.: US 12,334,277 B2
(45) Date of Patent: Jun. 17, 2025

(54) AQUEOUS ELECTROLYTE SOLUTION, POWER STORAGE DEVICE AND MANUFACTURING METHOD OF THE POWER STORAGE DEVICE

(71) Applicant: WAYS TECHNICAL CORP., LTD., Yaoyuan (TW)

(72) Inventors: Wen-Hsien Ho, Taoyuan (TW); Shao-Wei Chieh, Taoyuan (TW); Hsing-Yi Chen, Taoyuan (TW); Wan-Ling Liao, Taoyuan (TW)

(73) Assignee: WAYS TECHNICAL CORP., LTD., Taoyuan (TW)

( * ) Notice: Subject to any disclaimer, the term of this patent is extended or adjusted under 35 U.S.C. 154(b) by 790 days.

(21) Appl. No.: 17/537,021

(22) Filed: Nov. 29, 2021

(65) Prior Publication Data

US 2022/0172902 A1    Jun. 2, 2022

(30) Foreign Application Priority Data

Nov. 30, 2020 (TW) .................. 109141969

(51) Int. Cl.
*H01G 9/035* (2006.01)
*H01G 9/00* (2006.01)
(Continued)

(52) U.S. Cl.
CPC .......... *H01G 9/035* (2013.01); *H01G 9/0029* (2013.01); *H01G 9/10* (2013.01); *H01G 9/145* (2013.01);
(Continued)

(58) Field of Classification Search
CPC ........ H01G 9/035; H01G 9/0029; H01G 9/10; H01G 9/145; H01G 11/60; H01G 11/84; H01M 10/0563; H01M 2300/0014
(Continued)

(56) References Cited

U.S. PATENT DOCUMENTS

2012/0328936 A1* 12/2012 Wessells ............. H01M 10/054
429/188
2013/0257389 A1* 10/2013 Lu ......................... H01G 11/30
29/25.03
(Continued)

FOREIGN PATENT DOCUMENTS

CN        105164835 A    12/2015
JP        1977053233 A    4/1977
(Continued)

OTHER PUBLICATIONS

Office Action with the 1st search report for corresponding CN Appln.202011412667.4 issued at Aug. 31, 2023.
(Continued)

*Primary Examiner* — James M Erwin
(74) *Attorney, Agent, or Firm* — Muncy, Geissler, Olds & Lowe, P.C.

(57) ABSTRACT

An aqueous electrolyte solution, a power storage device filled with the aqueous electrolyte solution, and a manufacturing method of the power storage device are illustrated. The aqueous electrolyte solution comprises alkali metal cations of different types. With the hydration enthalpy of the alkali metal cations of the different types, a simulated boiling point of the aqueous electrolyte solution is higher than the 105° C. of the conventional aqueous electrolyte solution. After processed by the reflow furnace at 250° C., the power storage device has no cracks found on its appearance, which meets the electrical requirements, and overcomes the problem of bursting of the power storage device filled with conventional aqueous electrolyte solution. The housing of the power storage device adopts liquid crystal polymer, and/or the power storage device is firstly vacuumed and then packaged, therefore increasing coulombic efficiency of electrical testing of the power storage device.

7 Claims, 1 Drawing Sheet

(51) Int. Cl.
- *H01G 9/10* (2006.01)
- *H01G 9/145* (2006.01)
- *H01G 11/60* (2013.01)
- *H01G 11/80* (2013.01)
- *H01G 11/84* (2013.01)
- *H01M 10/0563* (2010.01)

(52) U.S. Cl.
CPC ............ *H01G 11/60* (2013.01); *H01G 11/80* (2013.01); *H01G 11/84* (2013.01); *H01M 10/0563* (2013.01); *H01M 2300/0014* (2013.01)

(58) Field of Classification Search
USPC ........................................................ 429/207
See application file for complete search history.

(56) References Cited

U.S. PATENT DOCUMENTS

| | | | | |
|---|---|---|---|---|
| 2014/0016247 A1* | 1/2014 | Beguin | ................. | H01G 11/32 361/505 |
| 2014/0127591 A1* | 5/2014 | Wessells | ............... | H01M 10/36 429/188 |
| 2018/0301290 A1 | 10/2018 | Kenkyusho | | |

FOREIGN PATENT DOCUMENTS

| | | |
|---|---|---|
| JP | H05258994 A | 10/1993 |
| JP | H09293649 A | 11/1997 |
| JP | 2011119639 A | 6/2011 |
| JP | 2014072464 A | 4/2014 |
| JP | 2015090942 A | 5/2015 |
| JP | 2020087554 A | 6/2020 |
| TW | I270227 | 1/2007 |

OTHER PUBLICATIONS

1st Search Report for Corresponding TW Appln. 109141969 issued at Jan. 6, 2022.
1st Search Report for Corresponding JP Appln. 2021-190445 issued Dec. 20, 2022, 7 pages.
2nd Search Report for Corresponding TW Appln. 109141969 issued at Feb. 10, 2022.

* cited by examiner

AQUEOUS ELECTROLYTE SOLUTION, POWER STORAGE DEVICE AND MANUFACTURING METHOD OF THE POWER STORAGE DEVICE

BACKGROUND

Technical Field

The present disclosure relates to an aqueous electrolyte solution, a power storage device and manufacturing method of the power storage device, and in particular to, the power storage device which interior is filled with the aqueous electrolyte solution. Specifically, the present disclosure further relates to the aqueous electrolyte solution which is filled in the interior of a capacitor, a supercapacitor or a battery, and to the manufacturing method of the capacitor, the supercapacitor or the battery.

Related Art

With the demand for miniaturization of integrated circuits of electronic components, in addition to correspondingly miniaturizing the size of the capacitor in the electronic components, the capacitor can also be welded on the circuit board via a surface-mount technology, so that the entire electronic components meet the requirements of miniaturization. Generally, according to the application requirements of electronic components, the aforementioned capacitor welded by using the surface-mount technology can be a solid electrolytic capacitor or a liquid electrolytic capacitor. In terms of cost competition, the liquid electrolytic capacitor is advantageous since the cost of the liquid electrolytic capacitor is lower than that of the solid electrolytic capacitor.

The electrolyte in the liquid electrolytic capacitor can be further divided into a non-aqueous electrolyte solution and an aqueous electrolyte solution, and the solvent used in the non-aqueous electrolyte solution is an organic solvent. Since the organic solvent is contained inside the electrolytic capacitor, the electrolytic capacitor filled with the non-aqueous electrolyte solution usually has a higher internal equivalent series resistance (ESR) value, which makes the capacity density lower. Further, during the manufacturing process may be accidentally detonated because the solvent has a flash point. Even the manufacturing process must be performed in a special environment to ensure that the moisture content in the non-aqueous electrolyte solution is less than 20 ppm, which increases the manufacturing cost. By contrast, regarding the electrolytic capacitor filled with aqueous electrolyte solution, since the solvent is water and the conductivity of water is higher than that of organic solvents, the internal equivalent series resistance value is lower and the capacity density is higher. Further, during the manufacturing process, the electrolytic capacitor will not be detonated, and there is no need to worry about moisture content at all. Therefore, in the comprehensive evaluation of cost, equivalent series resistance, capacity density and manufacturing process safety, the electrolytic capacitor filled with the aqueous electrolyte solution has higher advantages.

However, when the surface-mount technology is used to weld the electrolytic capacitor filled with the conventional aqueous electrolyte solution to the circuit board via the reflow manner at 250° C., since the conventional aqueous electrolyte solution is indirectly heated during welding, the electrolytic capacitor is heated higher than the boiling point of the solution. For example, a temperature corresponding to a highest peak of a specific heat capacity ($C_P$), measured by a thermogravimetric analysis (TGA), being 105° C. is used to simulate the simulated boiling point of the solution. The results of the implementation show that the electrolytic capacitor will be exploded due to the vaporization and expansion of the solution during the reflow process at 250° C., which causes cracks generated on the appearance of the electrolytic capacitor. Even although there is no crack in the appearance after reflowing, the internal structure of the electrolytic capacitor has actually been destroyed, resulting in failure to charge or in failure to meet the charging standard.

SUMMARY

In view of this, the objective of the present disclosure is to provide an aqueous electrolyte solution with a high boiling point, a power storage device filled with the aforementioned aqueous electrolyte solution and a manufacturing method of the power storage device, so that after the aforementioned power storage device is welded to a circuit board by using reflow, the appearance of the power storage device has no cracks, and the power storage device can still reach the predetermined charging standard.

The present disclosure provides an aqueous electrolyte solution at least comprising a solvent and cations of at least two types, wherein the solvent is water, and the cations of the two types are alkali metal cations of two alkali metals.

In one embodiment, the aqueous electrolyte solution at least comprises potassium ions, and a molality of the potassium ions is greater than that of the alkali metal cations of the other one alkali metal.

In one embodiment, the alkali metal cations of the two alkali metals are potassium ions and lithium ions respectively, a molality of the potassium ions is not less than 30.6 mol/Kg, and a molality of the lithium ions is not less than 10.1 mol/Kg.

In one embodiment, the alkali metal cations of the two alkali metals are obtained from two alkali metal salts respectively, wherein types of anions of the two alkali metal salts are identical to each other.

The present disclosure further provides an aqueous electrolyte solution at least comprising a solvent and cations of at least three types, wherein the solvent is water, and the cations of the three types are alkali metal cations of three alkali metals respectively.

In one embodiment, the aqueous electrolyte solution at least comprises potassium ions, and a molality of the potassium ions is greater than that of the alkali metal cations of each of the other two alkali metals.

In one embodiment, the alkali metal cations of the three alkali metals are potassium ions, lithium ions and cesium ions respectively, a molality of the potassium ions is not larger than 15.1 mol/Kg, and a molality of the lithium ions is not larger than 40.8 mol/Kg, and a molality of the cesium ions is not larger than 15.6 mol/Kg.

In one embodiment, the alkali metal cations of the three alkali metals are potassium ions, lithium ions and cesium ions respectively, a molality of the potassium ions is between 5.1 mol/Kg and 15.1 mol/Kg, and a molality of the lithium ions is between 10.2 mol/Kg and 40.8 mol/Kg, and a molality of the cesium ions is not larger than is between 0.05 mol/Kg and 15.6 mol/Kg.

In one embodiment, the molality of the potassium ions is between 12.1 mol/Kg and 15.1 mol/Kg, and the molality of the lithium ions is between 35.7 mol/Kg and 40.8 mol/Kg, and the molality of the cesium ions is not larger than is between 5.2 mol/Kg and 10.4 mol/Kg.

The present disclosure further provides an aqueous electrolyte solution which used to be filled in interior of a power storage device and at least comprises a solvent and cations of at least one type, wherein the solvent is water, and the cations of the one type are alkali metal cations of one alkali metal.

In one embodiment, the alkali metal cations of the alkali metal are potassium ions, and a molality of the potassium ions is not less than 30.6 mol/Kg.

The present disclosure further comprises a power storage device at least comprising a housing, a first electrode, a second electrode and an electrolyte layer; wherein interior of the housing forms an accommodating space, the electrolyte layer is disposed between the first electrode and the second electrode, the first electrode, the second electrode and the electrolyte layer are disposed and sealed in the accommodating space, the electrolyte layer is formed by filling an aqueous electrolyte solution, and the housing is made of liquid crystal polymer resin. The aqueous electrolyte solution can be the above mentioned aqueous electrolyte solution.

The present disclosure further provides a manufacturing method of a power storage device used to package the power storage device, wherein the power storage device at least comprises a housing, a first electrode, a second electrode and an electrolyte layer, and the method comprises steps of: forming an accommodating space at interior of the housing; disposing the electrolyte layer between the first electrode and the second electrode, and disposing and packaging the first electrode, the second electrode and the electrolyte layer in the accommodating space; and before disposing and packaging the first electrode, the second electrode and the electrolyte layer in the accommodating space, making the accommodating space have a negative pressure.

In one embodiment, the electrolyte layer is formed by filling an aqueous electrolyte solution. The aqueous electrolyte solution can be the above mentioned aqueous electrolyte solution.

In one embodiment, the housing is made of aluminum plastic film or liquid crystal polymer resin.

In one embodiment, the negative pressure is a gas pressure less than 760 torr.

The simulated boiling point of the aqueous electrolyte solution of the present disclosure measured by the thermogravimetric analysis is higher than 105° C., which is better than the conventional aqueous electrolyte solution. After processed by the reflow furnace at 250° C., the power storage device filled with the aqueous electrolyte solution of the present disclosure has no cracks found on its appearance, and meets the electrical requirements. Thus, the power storage device of the present disclosure overcomes the problem of bursting of the power storage device filled with conventional aqueous electrolyte solution. The housing of the power storage device adopts liquid crystal polymer, and/or the power storage device is firstly vacuumed and then packaged, therefore increasing coulombic efficiency of electrical testing of the power storage device.

BRIEF DESCRIPTIONS OF DRAWINGS

Embodiments will be readily understood by the following detailed description in conjunction with the accompanying drawings. To facilitate this description, like reference numerals designate like structural elements. Embodiments are illustrated by way of example, and not by way of limitation, in the FIGURE of the accompanying drawings. All of the drawings of the present disclosure are listed and briefly described as follows.

DETAILED DESCRIPTIONS OF EXEMPLARY EMBODIMENT

Figure 1:
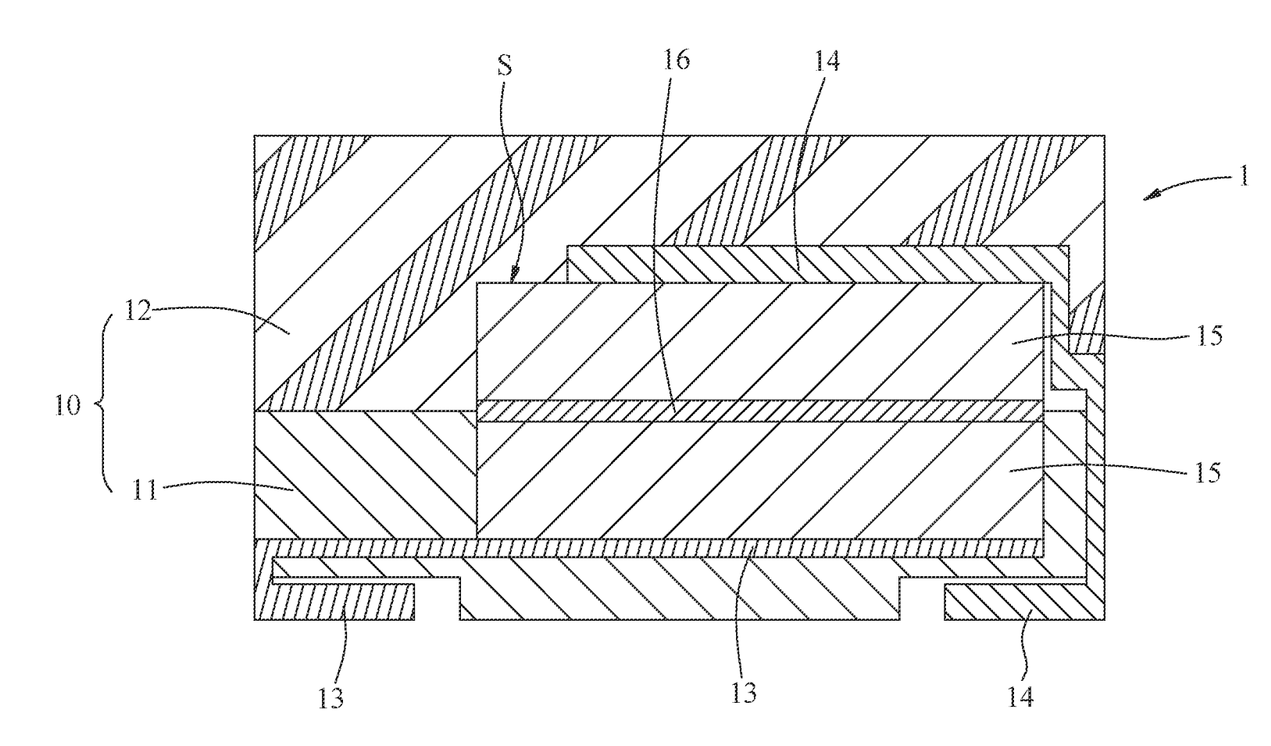
The FIGURE is a schematic diagram show a structure of a power storage device of the present disclosure.

While embodiments are described herein by way of example for several embodiments and illustrative drawings, those skilled in the art will recognize that embodiments are not limited to the embodiments or drawings described. It should be understood, that the drawings and detailed description thereto are not intended to limit embodiments to the particular form disclosed, but on the contrary, the intention is to cover all modifications, equivalents and alternatives falling within the spirit and scope as defined by the appended claims.

The present disclosure mainly provides an aqueous electrolyte solution, which is an aqueous electrolyte solution with a high boiling point. The aqueous electrolyte solution is suitable for filling the inside of a power storage device, and the power storage device can be a battery, a capacitor or a supercapacitor. The aqueous electrolyte solution at least comprises a solvent and cations of at least one type. The solvent is water and the aqueous electrolyte solution does not contain any organic solvent; the cations are alkali metal cations, which are selected from the group consisting of lithium ions, sodium ions, potassium ions and cesium ions. For example, a molality of the potassium ions in the aqueous electrolyte solution is not larger than 15.1 mol/Kg, and a molality of the lithium ions in the aqueous electrolyte solution is not larger than 40.8 mol/Kg, and a molality of the cesium ions in the aqueous electrolyte solution is not larger than 15.6 mol/Kg. Preferably, the molality of the potassium ions is between 12.1 mol/Kg and 15.1 mol/Kg, and the molality of the lithium ions is between 35.7 mol/Kg and 40.8 mol/Kg, and the molality of the cesium ions is not larger than is between 5.2 mol/Kg and 10.4 mol/Kg. It is noted that the limits of the numerical range stated in the scope and specifications of the disclosure always include the end values; the concentration stated in the scope and specifications of the disclosure is the molality, and its unit is mol/Kg.

The cations can be come from an alkali metal salt, for example, the lithium ions of the cations can be come from a lithium salt, and the lithium salt may be a lithium bis (trifluoromethanesulfonyl)imide, a lithium iodide, a lithium acetate, a lithium perchlorate, a lithium sulfate or a lithium molybdate. The sodium ions of the cations can be come from a sodium salt, which can be a sodium perchlorate, a sodium acetate or a sodium iodide. The potassium ions of the cations can be come from a potassium salt, which can be a potassium iodide or a potassium acetate. The cesium ions of the cations can be come from a cesium salt, which can be a cesium iodide or a cesium acetate.

Preferably, the aqueous electrolyte solution at least comprises the solvent, the cations of at least two types and anions of at least one type. The anions can be molybdate ions, sulfate ions, perchlorate ions, acetate ions, iodide ions or imide ions. The sources of the cations of the two kinds are two alkali metal salts, and the two alkali metal salts have the same anions. For example, the two alkali metal salts are twos selected from the group consisting of a lithium acetate, a sodium acetate, a potassium acetate and a cesium acetate. The main reason for adopting the design of at least two types of cations and one type of anion is to use different doping of the cations of the types to inhibit the crystallization of the aqueous electrolyte solution, so that the aqueous electrolyte solution remains stable under supersaturated conditions. More preferably, in order to eliminate the mutual interference of different solubility between different anions and cations, the aqueous electrolyte solution contains only one type of the anions, for example, acetate ions.

The aqueous electrolyte solution needs to consider the following two points. (1) The boiling point of the solution can be increased by reducing the vapor pressure of the solution, and the smaller the ion diameter of the cations is, the larger the hydration enthalpy of the cations is, that is, when the ability of the cations to capture water of the solution to prevent its dissipation or reaction is increased, the vapor pressure of the solution drops and the boiling point rises. (2) In addition, it is also necessary to consider that the solubility of the alkali metal salts with a smaller ionic radius is lower, and that the solubility of alkali metal salts with a larger ionic radius is higher. Based on the comprehensive consideration of the above two points, when selecting the alkali metal salts, it is better to choose the lithium salt, sodium salt or potassium salt with the radius of the cations not greater than (i.e. less than or equal to) that of the potassium ions, and the cations of one of the aforementioned at least two types are the potassium ions. The molality of the potassium ions is greater than molality of the alkali metal cations of other each alkali metal. Preferably, the aqueous electrolyte solution at least comprises the solvent, the cations of two types and the anions of one type, wherein the solvent is water, the cations of the two types are respectively potassium ions and lithium ions, and the aqueous electrolyte solution comprises the anions of the only one type, which are acetate ions.

Preparation of the aqueous electrolyte solution is illustrated as follows.

The aqueous electrolyte solution can be manufactured by a method including the following steps. (1) According to TABLE 1, prepare the alkali metal salts of the corresponding weights and the water of the corresponding weights. (2) Put the prepared alkali metal salts and the water into a container to form a solution, then heat the solution to make the alkali metal salts be completely dissolved, and then stand the solution to cool to a room temperature to form the aqueous electrolyte solution.

TABLE 1

| INDEX OF EM- BODIMENT OR EXAMPLE INDEX OF AQUEOUS ELEC- TROLYTE SOLUTION | CESIUM ACETATE (Kg) | POTAS- SIUM ACETATE (Kg) | LITHIUM ACETATE (Kg) | MAG- NESIUM ACETATE (Kg) | WATER (Kg) |
|---|---|---|---|---|---|
| E1 | 0 | 3 | 0 | — | 1 |
| E1-1 | 0 | 3 | 0.01 | — | 1 |
| E2 | 0 | 45 | 10 | — | 15 |
| E2-1 | 0.15 | 45 | 10 | — | 15 |
| E3 | 12 | 36 | 8 | — | 12 |
| E4 | 36 | 24 | 8 | — | 12 |
| E5 | 10 | 40 | 8 | — | 10 |
| E6 | 20 | 35 | 10 | — | 10 |
| E7 | 12 | 30 | 4 | — | 12 |
| E8 | 30 | 15 | 10 | — | 15 |
| CP1 | — | — | — | 0.01 | 1 |

It is noted that the preparation method of the aqueous electrolyte solution in the comparative example CP1 is an imitation example, and will not be repeated herein. The aqueous electrolyte solutions of embodiments E1, E1-1, E2, E2-1 and E3 through E8 can be prepared as mentioned above.

Conversion of the molarity of the cations in the aqueous electrolyte solution is illustrated as follows.

The weight of the alkali metal salt in TABLE 1 can be divided by the molecular weight to obtain the mole number of the alkali metal salt, and then the mole number of the alkali metal salt can be divided by the weight of water (solvent) to obtain the molarity of the alkali metal salt in the aqueous electrolyte solution, which is also the value of the molarity of the alkali metal cations of the alkali metal corresponding to the alkali metal salt. The calculation results are listed in the following TABLE 3. It is noted that when converted from the weight of the alkali metal salt in TABLE 1 to the molarity of alkali metal cation in TABLE 3, the calculation is performed under the condition that the molecular weight of cesium acetate is seemed as 191.95 g/mol, the molecular weight of potassium acetate is seemed as 98.14 g/mol, and the molecular weight of lithium acetate is seemed as 65.99 g/mol. The molecular weight of magnesium acetate of the comparative example is seemed as 142.39 g/mol, and the molarity of the magnesium acetate is 0.07 mol/Kg.

Measurement of the simulated boiling point of the aqueous electrolyte solution is illustrated as follows.

The simulated boiling point of the aqueous electrolyte solution is the temperature corresponding to the highest peak of the specific heat capacity (CP) measured by the thermogravimetric analysis (TGA) as the simulated boiling point of the solution, which is recorded in TABLE 3 below. If the simulated boiling point is not greater than 110° C., it is judged to be bad and marked as "X". If the simulated boiling point is between 110° C. and 135° C., it is judged to be acceptable and marked as "Δ". If the simulated boiling point is higher than 135° C., it is judged to be good and marked as "○". If the simulated boiling point is not less than 155° C., it is judged to be particularly good and marked as "00". The model number of the thermogravimetric analysis is TGA Q50 (TA Instruments). The operation method is described as follows. (1) Take aqueous electrolyte solution of 8-12 mg. (2) Start recording the weight and temperature. (3) Increase the temperature at a heating rate of 30° C. per minute to make the temperature increased to 200° C., and continuously record the weight and temperature the heating period.

Cyclic voltammetry (CV) test of the aqueous electrolyte solution is illustrated as follows.

The aqueous electrolyte solution is tested via the cyclic voltammetry method, and the current amperage of the reduction peak is recorded in TABLE 3 below. If the current amperage of the reduction peak is less than 4 mA and greater or equal to 2.1 mA, it is judged as acceptable and marked as "Δ". If the current amperage of the reduction peak is less than 2.1 mA, it is judged as good and marked as "0". If the current amperage of the reduction peak is less than 1.5 mA, it is judged to be particularly good and marked as "00". The lower the current ampere value of the reduction peak is, the smaller the polarization phenomenon of the aqueous electrolyte solution is, and the greater the ability of capturing the water in the solution to prevent the aqueous electrolyte solution from dissipating or reacting is. As mentioned above, this can make the vapor pressure of the aqueous electrolyte solution drop and the boiling point of the aqueous electrolyte solution rise. The test conditions of cyclic voltammetry are described as follows. (1) Electrode area is 10 mm×10 mm. (2) CV parameter is setting as follows: 1. potential scanning rate dE/dt=10 mV/s; 2. potential scanning limit E1=2 V vs ref; and 3. reverse potential scan limit E2=0 V vs ref.

Application of the aqueous electrolyte solution of the present disclosure is illustrated as follows.

The application of the aqueous electrolyte solution can be referred in the FIGURE, wherein the power storage device 1 comprises a housing 10, a first electrode 13, a second electrode 14, an separator film 16 and an electrolyte layer 15. Interior of the housing 10 forms an accommodating space S, the electrolyte layer 15 is disposed between the first electrode 13 and the second electrode 14, the separator film 16 is disposed inside the electrolyte layer 15 and has a function of conducting and transferring ions, the first electrode 13, the second electrode 14, the separator film 16 an the electrolyte layer 15 are disposed and sealed in the accommodating space S, and the first electrode 13 and the second electrode 14 a are respectively led out of the two sides and/or two ends of the bottom of the housing 10 to form conductive pins. The housing 10 is formed by combining a bottom housing 11 and a top housing 12, the accommodating space S is formed between the bottom housing 11 and the top housing 12, the first electrode 13 is disposed in the bottom housing 11, the second electrode 14 is disposed in the top housing 12, and the first electrode 13 and the second electrode 14 are respectively led out of the bottom housing 11 and the top housing 12. The power storage device 1 is a supercapacitor, the electrolyte layer 15 is filled with the aqueous electrolyte solution of the present disclosure, the housing 10 is electrically insulated and rectangular, and the bottom housing 11 and the top housing 12 are combined by ultrasonic welding to seal and package the first electrode 13, the second electrode 14, the separator film 16, and the electrolyte layer 15 in the accommodating space S.

The aforementioned first electrode 13 and the second electrode 14 are conductors made of conductive materials with electronic conduction function, and are independently metal foils, metal plates, metal meshes, activated carbon coated metal meshes, activated carbon coated metal plates, activated carbon coated metal foils, activated carbon cloth, activated carbon fibers, metal composite meshes, metal composite plates, transition metal oxide layers or plates made of transition metal oxides, or conductive polymer layers made of the conductive polymer. Preferably, the aforementioned first electrode 13 and the second electrode 14 may be nickel metal foils. More preferably, the aforementioned first electrode 13 and the second electrode 14 may be nickel metal foils with activated carbon coatings on the surfaces.

The bottom housing 11, the top housing 12, and the housing 10 are respectively insulating layers made of insulating materials, preferably, the insulating materials with acid and alkali resistance, high water resistance, and gas permeability resistance, such as aluminum plastic film, glue or epoxy molding compound (EMC) with the thermosetting ability, or epoxy resin coated with aluminum plastic film.

The interior of the electrolyte layer 15 is provided with the separator film 16 with ion conduction function, and the separator film 16 may be a cellulose film, a single-layer or multi-layer polypropylene (PP) film, a polyethylene (PE) film, a polytetrafluoroethene (PTFE) membrane, a polyvinylidene fluoride (PVDF) membrane or a composite membrane of any combination of the above.

The structure of the power storage device 1 can refer to the contents disclosed in issued patents of TW M598511 and TW 1528612.

Manufacturing of the power storage device 1 (supercapacitor) is illustrated as follows.

The electrolyte layer 15 can be formed by filling one of the aqueous electrolyte solutions of the embodiments E1, E1-1, E2, E2-1 and E3 through E8 and the comparative example CP1, and can be packaged to form the power storage device of one the application embodiments AE1, AE1-1, AE2, AE2-1 and AE3 through AE8 and the comparative example ACP1, as shown in TABLE 2. The first electrode 13 and the second electrode 14 are nickel metal foils with activated carbon coatings on the surfaces, and the bottom housing 11, the top housing 12 and the housing 10 are respectively made of epoxy resin. The dimension of the supercapacitor is a 10 mm×10 mm×4 mm (length×width× height).

TABLE 2

| APPLICATION EMODIMENT OR EXAMPLE INDEX OF POWER STORAGE DEVICE | THE USED AQUEOUS ELECTROLYTE SOLUTION OF EMBODIMENT OR EXAMPLE |
|---|---|
| AE1 | E1 |
| AE1-1 | E1-1 |
| AE2 | E2 |
| AE2-1 | E2-1 |
| AE3 | E3 |
| AE4 | E4 |
| AE5 | E5 |
| AE6 | E6 |
| AE7 | E7 |
| AE8 | E8 |
| ACP1 | CP1 |

The power storage devices are respectively application embodiments AE1, AE-1, AE2, AE2-1, AE3 through AE8 made of the aqueous electrolyte solutions of the embodiments E1, E1-1, E2, E2-1, E3 through E8, and the power storage device is an application example ACP1 of the aqueous electrolyte solution of the comparative example CP1.

Testing of Surface-Mount Technology:

The power storage devices (supercapacitors) of the application embodiments AE1, AE1-1, AE2, AE2-1 and AE3 through AE8 and the application comparative example ACP1 are processed a Panasonic BM221/BM231 reflow furnace at a temperature of 250° C., then taken out after 240 seconds of staying in the furnace, and waited for the supercapacitors to be cooled. After the supercapacitors are cooled, the following items are observed and measured.

(1) Appearance inspection: observe the appearance of the supercapacitor with the aid of a microscope. If cracks are found, it is judged as failure and marked as "X". If no cracks are found, it is judged as good and marked as "0".

(2) Electrical testing: the charge-discharge measurement is performed with a Bio-logic BCS-815 supercapacitor in a constant current-constant voltage (CCCV) charging mode and a constant current (CC) discharge mode at a temperature of 25° C. The supercapacitor of the present disclosure is charged to 1.25 V with a current of 20 C (p.s. C is the ratio of battery charge and discharge current), and then is discharged to 0V with the current of 20 C. The coulombic efficiency is used to judge the performance. If the coulombic efficiency is less than 50%, it is judged as poor and marked as "X". If the coulombic efficiency is judged between 50% and 80%, it is judged as acceptable and marked as "Δ". If the coulombic efficiency is higher than 80%, it is judged as good and marked as "○".

The results of the appearance inspection and the electrical testing are recorded in TABLE 3 below.

TABLE 3

| INDEX OF APPLICATIONN EMBODIMENT OR EXAMPLE OF POWER STORAGE DEVICE | INDEX OF EMBODIMENT OR EXAMPLE OF AQUEOUS ELECTROLYTE SOLUTION | C1 | C2 | C3 | C4 | SIMULATED BOILING POINT (° C.) | TR (mA) | A | E | O |
|---|---|---|---|---|---|---|---|---|---|---|
| AE1 | E1 | 0 | 30.6 | 0 | 30.6 | 115 Δ | 2.5 Δ | ○ | Δ | Δ |
| AE1-1 | E1-1 | 0 | 30.6 | 0.15 | 30.75 | 115 Δ | 2.5 Δ | ○ | Δ | Δ |
| AE2 | E2 | 0 | 30.6 | 10.1 | 40.7 | 152 ○ | 1.55 ○ | ○ | ○ | ○ |
| AE2-1 | E2-1 | 0.05 | 30.6 | 10.1 | 40.75 | 152 ○ | 1.55 ○ | ○ | ○ | ○ |
| AE3 | E3 | 5.2 | 30.6 | 10.1 | 45.9 | 152 ○ | 1.5 ○ | ○ | ○ | ○ |
| AE4 | E4 | 15.6 | 20.4 | 10.1 | 46.1 | 135 Δ | 2.1 Δ | ○ | Δ | Δ |
| AE5 | E5 | 5.2 | 40.8 | 12.1 | 58.1 | 155 ○○ | 1.05 ○○ | ○ | ○ | ○○ |
| AE6 | E6 | 10.4 | 35.7 | 15.1 | 61.2 | 155 ○○ | 1.27 ○○ | ○ | ○ | ○○ |
| AE7 | E7 | 5.2 | 25.4 | 5.1 | 35.7 | 140 ○ | 2.05 ○ | ○ | ○ | ○ |
| AE8 | E8 | 10.4 | 10.2 | 10.1 | 30.7 | 120 Δ | 2.4 Δ | ○ | Δ | Δ |
| ACP1 | CP1 | 0 | 0 | 0 | 0.07 ($Mg^{2+}$) | 105 X | — | X | X | X |

In TABLE 3, the terms C1, C2, C3 and C4 respectively mean molalites of cesium ions, potassium ions, lithium ions and alkali metal cations, and the unit of the molality is mol/Kg. The term TR means the cyclic voltammetry testing, the term E means the electrical testing, the term A means the appearance inspection, and the term O means the overall evaluation.

The application embodiments, the application example, the embodiments, and the application comparative example, and comparative example are subjected to the aforementioned three tests of simulated boiling point, appearance inspection, and electrical testing. If any "X" appears in the test results of a row, the "overall evaluation" of the row in TABLE 3 is marked as "X", which means it does not meet the requirements of the present disclosure; if any "Δ" appears in the test results of a row, the "overall evaluation" of the row in TABLE 3 is marked as "Δ", which means it meets the requirements of the present disclosure; if "○" appears in all three test results of a row, the "overall evaluation" of the row in TABLE 3 is marked as "○", which means it not only meets the requirements of the present disclosure, but also the preferred embodiment. If both the appearance inspection and electrical testing results of a row in TABLE 3 show "○", and the simulated boiling point test of the row shows "○○", the "overall evaluation" of the row is marked as "○○", which represents this embodiment It not only meets the requirements of the present disclosure but also is the better embodiment.

From TABLE 3, the application embodiments AE1, AE1-1, AE2, AE2-1 and AE3 through AE8 meet the requirements of the present disclosure, and the application comparative example ACP1 does not meet the requirements of the present disclosure.

In addition, TABLE 3 shows that the results of "overall evaluation" of the application embodiments AE5 and AE6 are marked as "○○", so the application embodiments AE5 and AE6 are the better embodiments. The application embodiment AE5 is corresponding to the embodiment E5, the molality of the cesium ions is 5.2 mol/Kg, the molality of potassium ion is 40.8 mol/Kg, and the molality of lithium ion is 12.1 mol/Kg. The application embodiment AE6 is corresponding to the embodiment E6, the molality of the cesium ions is 10.4 mol/Kg, the molality of potassium ion is 35.7 mol/Kg, and the molality of lithium ion is 15.1 mol/Kg. Therefore, optimally, the molality of lithium ions is between 12.1 mol/kg and 15.1 mol/Kg, the molality of potassium ions is between 35.7 mol/kg and 40.8 mol/Kg, and the molality is between 5.2 mol/kg and 10.4 mol/Kg.

As mentioned above, in the entire creative process of the present disclosure, the aqueous electrolyte solution needs to consider the following two points. (1) With the addition and combination of alkali metal cation, the simulated boiling point of the solution can be increased, and the vapor pressure of the solution can be reduced. It is noted that the smaller the ion diameter of the cations is, the larger the hydration enthalpy of the cations is, and that is, the ability of the cations to capture water of the solution to prevent its dissipation or reaction is enhanced when the ion diameter of the cations is increased. (2) In addition, it is also necessary to consider that the solubility of the alkali metal salts with a smaller ionic radius is lower, and that the solubility of alkali metal salts with a larger ionic radius is higher. Therefore, in addition to considering how to choose the type and combination of alkali metal cations, it must also be considered to make the power storage device (supercapacitor) filled with the aqueous electrolyte solution pass the appearance inspection and electrical testing. Therefore, the application embodiments, embodiments, application comparative example, and comparative example in TABLE 3 are described as follows.

The aqueous electrolyte solution at least comprise the cations of the at least one type, and the cations can be the alkali metal cations of one alkali metal.

The application embodiment 1 adopts the potassium ions with a molality of 30.6 mol/Kg. The hydration enthalpy of potassium ions is large, which makes the simulated boiling point of the aqueous electrolyte solution reach 115° C. and between 110° C. and 135° C. It is judged to be acceptable and marked as "Δ". The current amperage of the reduction peak detected by cyclic voltammetry is 2.5 mA, which is less than 4 mA and greater or equal to 2.1 mA, and it is judged to be acceptable and marked as "Δ". The application embodiment 1 passes the appearance inspection and electrical testing, and the "overall evaluation" is marked as "Δ", which means that it meets the requirements of the present disclosure. By contrast, the application comparative example 1 does not adopt alkali metal cations. Although the magnesium ions are adopted, the molality of the magnesium ions is small, so the simulated boiling point is only 105° C., and the solution may be vaporized and expanded during the reflow process at 250° C., causing cracks to burst. Therefore, it is judged as a failure and marked as "X". The electrical testing also shows that the coulombic efficiency is lower than 50%, so it is also judged as poor and marked as "X".

Therefore, the aqueous electrolyte solution at least comprises cations of at least one type, the cations are alkali metal cations, preferably, the alkali metal cations are potassium ions, and the molality of the potassium ions is not less than (i.e. greater than or Equal to) 30.6 mol/kg.

The aqueous electrolyte solution at least comprises the cations of the at least two types, and the cations can be alkali metal cations of two alkali metals.

The application embodiment AE2 is added with 10.1 mol/Kg of lithium ions more than that of the application embodiment AE1, which has two effects as follows. (1) Since the ionic radius of lithium ions is smaller than that of potassium ions, the hydration enthalpy of lithium ions is greater than that of potassium ions. The lithium ions are better than potassium ions to seize the water in the solution and prevent it from dissipating. (2) The total molality of alkali metal cations is also improved. Thus, the two effects make the current amperage of the reduction peak of application embodiment AE2 be 1.55 mA smaller than the current amperage of the reduction peak of the application embodiment AE1 of 2.5 mA, and make the simulated boiling point of the application embodiment AE2 is as high as 152° C., which is 37° C. higher than 115° C. of the application embodiment AE1. As the simulated boiling point is increased, the appearance of the power storage device will not be cracked due to vaporization and expansion of the solution during reflow, and it can pass the appearance inspection. The internal structure of the power storage device will not be destroyed, so it can also pass the electrical testing.

Therefore, the aqueous electrolyte solution at least comprises cations of at least two types, and the cations are alkali metal cations of two alkali metals, preferably, the alkali metal cations of the two alkali metals are potassium ions and lithium ions, wherein the molality of the potassium ions is not less than 30.6 mol/Kg, and the molality of the lithium ion is not less than 10.1 mol/Kg. In particular, the design of the cations of the at least two types can further adopt different doping of the cations to inhibit the crystallization of the aqueous electrolyte solution, so that the aqueous electrolyte solution remains stable under supersaturated conditions.

The application embodiment AE1-1 is added with 0.15 mol/Kg of lithium ions more than that of the application embodiment AE1. Since the molarity of the added lithium ions is not large, the simulated boiling point and the current amperage of the reduction peak and application embodiment AE1-1 are the same as those of the application embodiment AE1.

The aqueous electrolyte solution at least comprises the cations of the at least three types, and the cations can be alkali metal cations of three alkali metals.

The application embodiments AE2-1, AE3 through AE8 are added with 0.05 mol/Kg to 15.6 mol/Kg of cesium ions more than that of the application embodiment AE2, which makes the aqueous electrolyte solution contain alkali metal cations of the three alkali metals (lithium ions, potassium ions and cesium ions). In addition to suppressing the precipitation of the aqueous electrolyte solution and keeping the aqueous electrolyte solution stable under supersaturated conditions, the doping of a variety of different cations is helpful to increase the solubility of the overall alkali metal salt because the ion radius of cesium ions is larger than that of lithium ions and potassium ions. The increase in the solubility of the overall alkali metal salt allows the aqueous electrolyte solution to contain more lithium ions and potassium ions. For example, the application embodiment AE5 is added with 5.2 mol/Kg of the cesium ions more than that of the application embodiment AE2. At the same time, the molality of the potassium ions of the application embodiment AE5 can be increased to 40.8 mol/Kg (in the application embodiment AE2, it is 30.6 mol/Kg), the molality of the lithium ions can be increased to 12.1 mol/Kg (in the application embodiment AE2, it is 10.1 mol/Kg). Therefore, the total molality (the sum of the molalities of the lithium ions, potassium ions and cesium ions) of the alkali metal cations of application embodiment AE5 is as high as 58.1 mol/Kg, which is higher than the total molality of alkali metal cations of application embodiment A2 of 40.7 mol/Kg, the difference of molality of alkali metal cations of such two application embodiments AE5 and AE2 is 17.4 mol/kg. The similar phenomenon also occurs in the comparison between the application embodiment AE6 and the application embodiment AE2, so it will not be repeated here. The total molality of the alkali metal cations in the aqueous electrolyte solution will increase the simulated boiling point, which can respond to the temperature variation in the reflow furnace. For example, the temperature varies from 250° C. to 280° C. due to unknown reasons during the reflow process, the simulated boiling point of application embodiment AE5 and the application embodiment AE6 is as high as 155° C., which is higher than 152° C. of the application embodiment AE2 by 3° C. Of course, more total molality of alkali metal cations will also make the result of charge-discharge measurement have higher coulombic efficiency. The total molality of alkali metal cations of the application embodiments AE6, AE7, and AE8 are retrospectively 61.2 mol/Kg, 35.7 mol/Kg, and 30.7 mol/Kg, the results of the coulombic efficiency of the electrical testing of the application embodiments AE6, AE7, and AE8 are respectively higher than 80% ("○"), between 50% and 80% ("Δ"), and lower than 50% ("X"). The addition of cesium ions also increases the upper limit of the overall saturation concentration of cations of other types due to the ion doping effect, thereby increasing the hydration enthalpy, which makes the current amperage of the reduction peak be between 1.05 mA and 2.4 mA. Taking the current amperage of the reduction peak as a comparison, the current amperage of the reduction peak of the application embodiment AE5 is 1.05 mA less than the current amperage of the reduction peak of the application embodiment AE6 which is 1.27 mA, so the application embodiment AE5 is better than application embodiment AE6.

Therefore, the aqueous electrolyte solution at least comprises cations of at least three types. The cations are alkali metal cations of three alkali metals. Preferably, the alkali metal cations of the three alkali metals are lithium ions, potassium ions and cesium ions. The lithium ions have a molarity of 5.1 mol/Kg (application embodiment AE7) to 15.1 mol/Kg (application embodiment AE6), the molality of the potassium ions is between 10.2 mol/Kg (application embodiment AE8) and 40.8 mol/Kg (application embodiment AE5), the molality of the cesium ions is between 5.2 mol/Kg (application embodiments AE3, AE5, and AE7) to 15.6 mol/Kg (application embodiment AE4). The total molality of alkali metal cations is between 30.7 mol/kg (application embodiment AE8) to 61.2 mol/Kg (application embodiment AE6).

The application embodiment AE2-1 is added with 0.05 mol/Kg of the cesium ions more than that of the application embodiment AE2. Since the molarity of the added cesium ions is not large, the current amperage of the simulated boiling point and reduction peak and application embodiment AE2-1 are the same as those of the application embodiment AE2.

In particular, taking the current amperage of the reduction peak as the evaluation, the preferred order is as follows (from the excellent to the acceptable): the application embodiment AE5 (1.05 mA), the application embodiment AE6 (1.27 mA), the application embodiment AE3 (1.5 mA), the application embodiment AE2 (1.55 mA), the application embodiment AE7 (2.05 mA), the application embodiment AE4 (2.1 mA), the application embodiment AE8 (2.4 mA) and the application embodiment AE1 (2.5 mA).

The molality of the potassium ion is greater than the molality of the alkali metal cations of other individual alkali metal.

One of the differences between the application embodiment AE8 and the application embodiments AE3 through AE7 that the molality of the cesium ions concentration of the application embodiment AE8 is 10.4 mol/Kg, which is greater than the molality of the potassium ions being 10.2 mol/Kg. Because the hydration enthalpy of cesium ions is smaller than that of potassium ions, the vapor pressure cannot be effectively reduced. Thus, the increase of the simulated boiling point is not obvious. As a result, the simulated boiling point of the application embodiment AE8 is only raised to 120° C., which is much lower than the simulated boiling point of the application embodiment AE5 and AE6 of 155° C.

Therefore, preferably, the molality of the potassium ions in the aqueous electrolyte solution is greater than the molality of the alkali metal cations of other individual alkali metal.

The material of the housing of the power storage device (supercapacitor) is illustrated as follows.

In addition, changing the material properties of the housing 10 can improve the coulombic efficiency of the electrical testing. Please refer to application embodiment AE4 and application embodiment AE4' in TABLE 4 below, wherein the housing material of the power storage device of the application embodiment AE4 is epoxy resin, and the housing material of the power storage device of the application embodiment AE4' is a liquid crystal polymer resin.

TABLE 4

| INDEX OF APPLICATION EMBODIMENT OF POWER STORAGE DEVICE | INDEX OF EMBODIMENT OF AQUEOUS ELECTROLYTE SOLUTION | MATERIAL OF POWER STORAGE DEVICE HOUSING | SIMULATED BOILING POINT (° C.) | A | E | O |
|---|---|---|---|---|---|---|
| AE4 | E4 | EPOXY RESIN | 135 Δ | ○ | Δ | Δ |
| AE4' | E4 | LIQUID CRYSTAL POLYMER RESIN (COPOLYMER OF HYDROXYBENZOIC ACID AND HYDROXYNAPHTHOIC ACID) | 135 Δ | ○ | ○ | Δ |

In TABLE 4, the term E means the electrical testing, the term A means the appearance inspection, and the term O means the overall evaluation.

The liquid crystal polymer resin has a high glass transition temperature and melting point, and can be used continuously at a temperature below 300° C. without degrading its mechanical properties, so it is helpful to provide application embodiment AE4' for reflow at 250° C. At this time, the internal structure of the power storage device can be more stable, so that the coulombic efficiency of the electrical testing being between 50% and 80% ("Δ") in the application embodiment AE4 is increased to the value of the application embodiment AE4' which is higher than 80% ("○"). The liquid crystal polymer can refer to the contents disclosed in the Patent TW 1708814. The liquid crystal polymer contains terephthalic acid, isophthalic acid, 2,6-naphthalenedicarboxylic acid, 4-hydroxybenzoic acid, 6-hydroxy-2-naphthoic acid, hydroquinone, 4,4'-biphenol, acetaminophen or combination or repeating unit derived from the above.

A manufacturing method of the power storage device (supercapacitor) is illustrated as follows.

In addition, before the packaging in the manufacturing process of the power storage device 1, the accommodating space S provided with the first electrode 13, the second electrode 14 and the electrolyte layer 15 are formed with a negative pressure. For example, the accommodating space S is evacuated (for example, the air pressure is less than 760 torr, preferably 400 torr or less, more preferably less than 1 torr), and then the bottom housing 11 and the top housing 12 are ultrasonically welded and packaged. It is found that the results of the electrical testing will be improved. Please refer to TABLE 5 below.

TABLE 5

| INDEX OF APPLICATION EMBODIMENT OF POWER STORAGE DEVICE | INDEX OF EMBODIMENT OF AQUEOUS ELECTROLYTE SOLUTION | WHETHER TO VACUUM BEFORE PACKAGING (FORM NEGATIVE PRESSURE) | A | E |
|---|---|---|---|---|
| AE1 | E1 | NO | ○ | Δ |
| AE1' | E1 | YES | ○ | ○ |

It is noted that terms E and A in TABLE 5 respectively mean the electrical testing and the appearance inspection.

In the application embodiment AE1', the accommodating space S and the first electrode 13, the second electrode 14, the separator film 16 and the electrolyte layer 15 in the accommodating space S form a negative pressure before packaging. For example, the accommodating space S and the first electrode 13, the second electrode 14, the separator film 16 and the electrolyte layer 15 in the accommodating space S are evacuated. In the application embodiment AE1, those are not evacuated. Since the packaging after vacuuming will make the accommodating space S of the application embodiment AE1' have a better degree of heat insulation (in other words, the heat is less likely to be conducted to the first electrode 13 and the second electrode 14 in the accommodating space S, the separator film 16 and the electrolyte layer 15 when reflowing at 250° C.), the internal structure of the power storage device is more stable, so that the coulombic efficiency of the electrical testing being between 50% and 80% ("Δ") in the application embodiment AE1 is increased to the value of the application embodiment AE1' which is higher than 80% ("○"). The method of application embodiment AE1' can increase the degree of insulation of the accommodating space S, and this has the advantage of being able to respond to temperature variations in the reflow furnace. For example, the temperature may vary from 250° C. to 280° C. due to unknown reasons during the reflow process.

The simulated boiling point of the aqueous electrolyte solution of the present disclosure measured by the thermogravimetric analysis is higher than 105° C., which is better than the conventional aqueous electrolyte solution. The current amperage of the reduction peak of the aqueous electrolyte solution of the present disclosure is less than the current amperage of the reduction peak of the conventional aqueous electrolyte solution, indicating that the overall cations of the present disclosure have excellent hydration enthalpy. Further, after processed by the reflow furnace at 250° C., the power storage device filled with the aqueous electrolyte solution of the present disclosure has no cracks found on its appearance, and meets the electrical requirements. Thus, the power storage device of the present disclosure overcomes the problem of bursting of the power storage device filled with conventional aqueous electrolyte solution. The housing of the power storage device adopts liquid crystal polymer, therefore increasing coulombic efficiency of electrical testing of the power storage device. Moreover, the power storage device is firstly vacuumed and then packaged, therefore further increasing coulombic efficiency of electrical testing of the power storage device.

However, the above are only preferred embodiments of the present disclosure, and should not be used to limit the scope of implementation of the present disclosure, that is, simple equivalent changes and modifications made in accordance with the scope and descriptions of the present disclosure are still within the scope of the present disclosure. In addition, any embodiment of the present disclosure or the scope of the present disclosure does not need to achieve all the objectives or advantages or features disclosed in the present disclosure. In addition, the contents of abstract and title of the present disclosure are only used to assist the search for the related art, and are not used to limit the scope of rights of the present disclosure. In addition, the terms "first" and "second" mentioned in this specification or the scope of the present disclosure are only used to name the element (component) or to distinguish different embodiments or scopes, and are not used to limit the maximum number or minimum number of elements.

The invention claimed is:

1. An aqueous electrolyte solution, at least comprising: a solvent and cations of at least two types, wherein the solvent is water, and the cations of the two types are alkali metal cations of two alkali metals respectively;
   wherein the alkali metal cations of the two alkali metals are potassium ions and lithium ions respectively, a molality of the potassium ions is not less than 30.6 mol/Kg, and a molality of the lithium ions is not less than 10.1 mol/Kg.

2. The aqueous electrolyte solution of claim 1, wherein a molality of the potassium ions is greater than that of the alkali metal cations of the other one alkali metal.

3. The aqueous electrolyte solution of claim 1, wherein the alkali metal cations of the two alkali metals are obtained from two alkali metal salts respectively, wherein types of anions of the two alkali metal salts are identical to each other.

4. An aqueous electrolyte solution, at least comprising: a solvent and cations of at least three types, wherein the solvent is water, and the cations of the three types are alkali metal cations of three alkali metals respectively;
   wherein the alkali metal cations of the three alkali metals are potassium ions, lithium ions and cesium ions respectively, a molality of the potassium ions is between 5.1 mol/Kg and 15.1 mol/Kg, and a molality of the lithium ions is between 10.2 mol/Kg and 40.8 mol/Kg, and a molality of the cesium ions is not larger than is between 0.05 mol/Kg and 15.6 mol/Kg.

5. The aqueous electrolyte solution of claim 4, wherein a molality of the potassium ions is greater than that of the alkali metal cations of each of the other two alkali metals.

6. The aqueous electrolyte solution of claim 4, wherein the molality of the potassium ions is between 12.1 mol/Kg and 15.1 mol/Kg, and the molality of the lithium ions is between 35.7 mol/Kg and 40.8 mol/Kg, and the molality of the cesium ions is not larger than is between 5.2 mol/Kg and 10.4 mol/Kg.

7. An aqueous electrolyte solution, used to be filled in an interior of a power storage device, at least comprising: a solvent and cations of at least one type, wherein the solvent is water, and the cations of the one type are alkali metal cations of one alkali metal;
   wherein the alkali metal cations of the alkali metal are potassium ions, and a molality of the potassium ions is not less than 30.6 mol/Kg.

* * * * *